United States Patent [19]

Sexsmith

[11] Patent Number: 5,532,314
[45] Date of Patent: Jul. 2, 1996

[54] AQUEOUS SILANE-PHENOLIC ADHESIVE COMPOSITIONS, THEIR PREPARATION AND USE

[75] Inventor: Frederick H. Sexsmith, Erie, Pa.

[73] Assignee: Lord Corporation, Erie, Pa.

[21] Appl. No.: 434,015

[22] Filed: May 3, 1995

[51] Int. Cl.⁶ ..................... C08L 69/00
[52] U.S. Cl. ............ 524/611; 524/588; 524/841; 524/843; 525/474; 525/502; 525/505; 427/387
[58] Field of Search .................. 525/474, 505, 525/502; 524/588, 611, 841, 843; 427/387

[56] References Cited

U.S. PATENT DOCUMENTS

| | | |
|---|---|---|
| 4,124,554 | 11/1978 | Fry. |
| 4,210,562 | 7/1980 | McCombs .................. 524/44 |
| 4,369,263 | 1/1983 | Matsushima et al. ........ 524/440 |
| 4,618,389 | 10/1986 | Agodoa. |
| 4,690,966 | 9/1987 | Rende, Jr.. |
| 4,921,987 | 5/1990 | Hitze et al.. |
| 5,200,455 | 4/1993 | Warren. |
| 5,262,495 | 11/1993 | Gerber ..................... 525/506 |
| 5,300,562 | 4/1994 | Coventry et al. ........... 524/841 |

*Primary Examiner*—Melvyn I. Marquis
*Attorney, Agent, or Firm*—Howson and Howson

[57] ABSTRACT

A stable aqueous adhesive composition based on a combination of a normally water-immiscible organo-functional silane and a phenolic resole wherein the silane is dispersed in a stabilized aqueous dispersion of a phenolic resole.

16 Claims, No Drawings

5,532,314

AQUEOUS SILANE-PHENOLIC ADHESIVE COMPOSITIONS, THEIR PREPARATION AND USE

FIELD OF INVENTION

The present invention relates to aqueous formulations that are useful for bonding elastomers to various inorganic substrates such as metals, ceramics, and glass. More specifically, the invention relates to novel aqueous adhesive compositions based on normally water-immiscible organo-functional silanes which compositions are water-dilutable and do not require the presence of an organic solvent for the silane to form a stable and workable adhesive composition.

BACKGROUND OF THE INVENTION

Numerous silane adhesive compositions have previously been developed for the purpose of bonding elastomeric materials, particularly silicone elastomer-based materials, to various inorganic substrates. Many of these silane adhesive compositions rely on various organo-functional silanes as the active bonding agent. Due to the highly organic nature of the organo-functional silane compounds, traditional silane adhesive compositions have relied on organic solvents in order to form a stable and workable solution. While some traditional silane adhesive compositions contain water in addition to an organic solvent, the organic solvent is usually always required in order to form a stable composition.

One example of an organic solvent-based silane adhesive composition is described in U.S. Pat. No. 3,022,196 as being a mixture of an unsaturated silane and an aminoalkyl silane. For utilization as a coating composition or an adhesive, the mixture is prepared as a solution in the presence of a water-miscible organic solvent. The adhesive composition may also contain a small amount of water in addition to the water-miscible organic solvent; however, the water-miscible organic solvent in such case predominates.

Another example of an organic solvent-based silane adhesive composition is described in U.S. Pat. No. 4,618,389 as being a mixture of an alkenyltrihydrocarbonoxy silane, a water-miscible solvent, and water.

U.S. Pat. No. 4,690,966 describes an adhesive composition based on a combination of an organo-functional silane and an aluminum zirconium metallo-organic complex dissolved or dispersed in an organic solvent. A polymer resin which may be a phenolformaldehyde resin, such as a phenolic resole, may be included. Here again, while the adhesive composition may contain a small amount of water, the organic solvent predominates.

In light of the continuing effort to eliminate volatile organic solvents from all chemical formulations for environmental purposes, a need presently exists for an aqueous silane adhesive composition which is largely free of any volatile organic solvent and which is dilutable with water.

In my co-pending application Ser. No. 08/284,829 filed Aug. 2, 1994 are disclosed and claimed water-dilutable compositions based on a combination of an amine-functional silane and a normally water-immiscible alkenyl-functional silane hydrolyzed in the presence of the amine-functional silane.

SUMMARY OF THE INVENTION

The present invention relates to an aqueous adhesive composition comprising a normally water-immiscible organo-functional silane, co-dispersed with a stabilized phenolic resole dispersion in water.

It has been found that a normally water-immiscible organo-functional silane has unexpected compatibility and co-dispersibility with a stabilized dispersed water-insoluble phenolic resole in water. Thus, an organo-functional silane which is normally a water-immiscible liquid may be mixed with a stabilized dispersion of a substantially water-insoluble phenolic resole in water to provide a colloidal oil-in-water type emulsion which is water-dilutable and is relatively stable upon standing, the degree of stability depending upon the particular organo functional silane selected. The resulting composition possesses unique adhesive qualities, possibly even through synergistic action of the silane and resole, enabling its use as an adhesive for bonding elastomers, especially vulcanization bonding of specialty elastomers, to solid substrates such as metals, including use as a primer or overcoat and as a protective coating on metals.

DETAILED DESCRIPTION OF THE INVENTION

The organo-functional silanes used in accordance with the present invention may be represented by the formula:

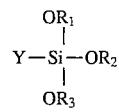

wherein Y is an alkenyl group having 2 to 4 carbon atoms, an alkenylalkyl group having 3 to 7 carbon atoms or a mercapto alkyl group having 2 to 4 carbon atoms, and $R_1$, $R_2$, and $R_3$ are the same or different alkyl or alkoxyalkyl groups having up to 4 carbon atoms. Examples of Y include vinyl, allyl, 1-butenyl, 2-butenyl, 1-isobutenyl, 2-isobutenyl, 1-sec-butenyl, 2-sec-butenyl, acrylpropyl, methacrylpropyl, mercaptomethyl, mercaptoethyl and mercaptopropyl, with vinyl and mercaptopropyl being preferred. Examples of $R_1$, $R_2$ and $R_3$ include methyl, ethyl, propyl, methoxyethyl, and the like, with methyl, ethyl and methoxyethyl being preferred. The preferred organo-functional silanes of the present invention are vinyltriethoxy silane, vinyltrimethoxy silane, mercaptopropyltrimethoxy silane and mercaptopropyltriethoxy silane.

The phenolic resoles, as is well known, are phenolaldehyde condensation products using excess aldehyde and formed in a basic medium. The phenol may be phenol itself, an alkyl-substituted phenol like m-cresol and t-butyl phenol, or a poly phenol like bisphenol A. The aldehyde may be formaldehyde, furfural, and the like. These base-catalyzed resins usually have an aldehyde to phenol molar ratio of at least 1.5. While this ratio may range up to 4, it is more typically from about 2 to about 3. Ordinarily, formaldehyde or a material that generates formaldehyde in situ is most often employed in the commercial manufacture of phenolic resoles. Another preferred resole is prepared by reacting formaldehyde with bisphenol A in a mol ratio of from about 2 to about 3.75 mols of formaldehyde per mol of bisphenol A.

The phenolic resole as used according to the present invention will be in the form of a stable dispersion of resole particles in water. A protective colloid is used for this purpose. One such protective colloid is polyvinyl alcohol. A particularly useful polyvinyl alcohol-stabilized phenolic resole dispersion and its preparation are described in U.S. Pat. No. 5,200,455 the disclosure of which is incorporated herein by reference. The resole dispersion described in this patent involves the use of a coupling solvent for the originally solid resole. The coupling solvent appears to soften or plasticize the resole so that the organo-functional silane merges with the resole particles forming a stable colloidal co-dispersion of the combined materials in water.

The proportions of organo-functional silane to phenolic resole may vary, from as little as about 1%, by weight, of organo-functional silane based on the weight of the phenolic resole solids up to about 100% on the same basis. As is understood by those familiar with adhesive requirements for various elastomers and substrates, the actual proportions may depend on such factors. For most purposes the proportion of organo-functional silane to phenolic resole will range from about 10% to about 30% by weight, of organo-functional silane based on the weight of the phenolic resole solids.

Initially, if any organic solvent is present beyond the coupling solvent for the resole, water will still predominate. Preferably the mixture initially is substantially devoid of any organic solvent beyond the coupling solvent for the resole. Hydrolysis of the organo-functional silane may occur in which case by-product alcohol, e.g. methyl or ethyl alcohol, will be formed and water will be consumed, but such nominal amount of generated alcohol appears not to hurt colloidal stability or bonding performance. In any case, however, the amount of water employed will be such that water will predominate in the resulting composition, and the composition will be substantially devoid of any organic solvent beyond the coupling solvent for the resole and alcohol generated during hydrolysis. It is this reliance on water as the carrier along with the non-reliance on any organic solvent beyond the coupling solvent for the resole and the merging of the silane with the stable dispersed resole that results in the novel combination of properties.

The water utilized in the present invention can be derived from any conventional source and can be, for example, tap water. Deionized water is preferred. In the compositions of the present invention, the solids content (organo-functional silane and phenolic resole) will generally make up from about 3% to about 40%, preferably from about 5% to about 30% by weight, the balance volatile portion being predominantly water.

In connection with the foregoing it may be desirable to strip the resulting composition by distillation under reduced pressure to minimize organic compound, e.g. alcohol, emissions when the adhesive composition is used.

The adhesive compositions of the present invention can optionally contain well-known additives including plasticizer, fillers, pigments, reinforcing agents, and the like, in amounts employed by those skilled in the adhesive arts to obtain the desired color and consistency. Typical optional additives include titanium dioxide, carbon black, and zinc oxide.

The present adhesive compositions are typically prepared by mixing the organo-functional silane and stabilized phenolic resole dispersion and agitating the combination of ingredients in a conventional manner. The amount of mixing or shaking required for an individual formulation may vary but, in all cases, a sufficient amount of agitation should be employed so as to ensure that the ingredients form a colloidal oil-in-water type emulsion which is water-dilutable. The temperature of the mixture during agitation may range from about 2° to about 80° C., preferably from about 15° to about 35° C.

Stability of the composition over time may depend upon the nature of the organo functional silane. When Y in the silane is an alkenyl or alkenylalkyl group, the adhesive composition is substantially more stable over time than when it is a mercapto alkyl group. In the latter case the product may be marketed as a two-part adhesive, the phenolic resole being in one container and the mercaptoalkyl functional silane being in another. Material from each container may then be mixed shortly before use to form the adhesive composition of the present invention.

The material which may be bonded to a surface such as metal, ceramic or glass with the adhesive compositions of the present invention, is preferably a polymeric material, including any elastomeric material selected from any of the natural rubbers and olefinic synthetic rubbers including polychloroprene, polybutadiene, neoprene, styrene-butadiene rubber, butyl rubber, brominated butyl rubber, nitrile butadiene rubber, and the like. It has been discovered that the adhesive compositions of the present invention are particularly effective in adhering to vulcanizing specialty elastomers that are either peroxide-(free radically) or sulfur-cured. Such specialty elastomers include peroxide-cured silicone, fluorosilicone, fluorocarbon, polyphosphazene and nitrile butadiene rubbers; and sulfur- or sulfur-peroxide-cured nitrile butadiene rubbers. It is believed that when the organo-functional silane is an alkenyl silane the latter is the active coupling agent for elastomers cured by peroxides, i.e. free radically. When a mercapto functional silane is employed the composition is especially useful for bonding sulfur- and sulfur-peroxide vulcanizing elastomers like sulfur- and sulfur-peroxide cured nitrile butadiene.

The surface to which the polymeric material is bonded can be any solid surface such as metal, ceramic, glass, fabric, or plastic surface capable of receiving the adhesive and is preferably a metal surface selected from any of the common structural metals such as iron, steel (including stainless steel), lead, aluminum, copper, brass, bronze, titanium, Monel metal, nickel, zinc, phosphatized steel, and the like.

As stated above, the adhesive composition of the invention is preferably utilized to bond an elastomeric material to a metal surface. The composition may be applied to the metal surface by spraying, dipping, brushing, wiping or the like, after which the adhesive is permitted to dry. The coated metal surface and elastomeric material are then typically brought together under heat and pressure to cure the adhesive and complete the bonding procedure. The surface of the metal and the elastomeric material are normally brought together under a pressure of from about 20.7 to 172.4 Mega Pascals (MPa), preferably from about 20 MPa to about 50 MPa. The resulting elastomer-metal assembly is simultaneously heated to a temperature of from about 100° C. to about 300° C., preferably from about 150° C. to 170° C. The assembly should remain under the applied pressure and temperature for a period of from about 3 minutes to about 60 minutes, depending on the cure rate and thickness of the elastomeric material. This process may be carried out by applying the elastomeric material as a semi-molten material to the metal surface as in, for example, an injection-molding process. The process may also be carried out by utilizing compression molding, transfer molding or autoclave curing techniques. The process may also involve a post-cure step as is known in the art. After the process is complete, the bond is fully vulcanized and ready for use in a final application.

Although the adhesive compositions of the present invention are preferred for bonding peroxide-, sulfur- and sulfur peroxide-cured elastomers to metal, the present adhesive compositions may be applied as an adhesive, primer or coating to any surface of substrate capable of receiving the adhesive. Thus it is possible to overlay the formulations of this invention with covercoats to which the formulations will knit when exposed to heat. Such covercoats may be in the nature of protective coatings or other adhesives in which case the silane composition can be classified as a primer. As an adhesive, the covercoat may embody chemistry which enables it to knit or bond to elastomers during vulcanization that are not themselves sufficiently bonded by the formulations of this invention.

The following examples are provided for illustration only and are not intended to limit the scope of the invention which is defined by the claims.

EXAMPLE I

Ten grams of vinyltriethoxy silane are stirred into 60 grams of a 45% non-volatile content dispersion of a phenolic bisphenol A resole in water stabilized with polyvinyl alcohol (BKUA-2370 of Georgia-Pacific Corporation). The vinyltriethoxy silane does not form oily droplets in the aqueous resole dispersion, but is rapidly emulsified or imbibed by the resole dispersed phase. The resulting co-dispersion evidences no change after several weeks storage.

EXAMPLE II

Twelve grams of methacrylpropyl trimethoxy silane are stirred into 60 grams of the stabilized phenolic resole dispersion in water as used in Example I. The silane is readily imbibed by the resole dispersion with no apparent adverse effects on its colloidal characteristics.

EXAMPLE III

Five grams of mercaptopropyl trimethoxy silane are stirred into 45 grams of the stabilized phenolic resole dispersion in water as used in Examples I and II. The resulting co-dispersion appears no different from the original phenolic resole dispersion before addition of the silane.

EXAMPLE IV

Two waterborne adhesive compositions are prepared as follows:

A. A 45% non-volatile content dispersion of phenolic resole in water as used in Examples I, II and III is diluted with deionized water to 20% non-volatile content.

B. 10.3 grams of vinyltriethoxy silane are stirred into 60 grams of the stabilized phenolic resole as used in Examples I, II and III. The co-dispersion is diluted with deionized water to 20% non-volatile content.

Zinc phosphatized steel coupons are dipped in the compositions A and B and dried. Vulcanization bonding is then attempted using a peroxide vulcanizing silicone elastomer which is a blend of 25 parts of Blensil SE44U (General Electric Co.), 25 parts of Blensil SE88U (General Electric Co.) and 0.4 parts of organic peroxide curing agent—2,5-dimethyl-2,5-di(t-butyl peroxy) hexane adsorbed to 45–50%, by weight on an adsorbent carrier powder (Varox Powder of R. T. Vanderbilt Co.). This elastomer in the form of ⅛" thick strips is vulcanized in contact with the adhesive-coated coupons in a vulcanization press for 15 minutes at 171° C.

After vulcanization the elastomer-coupon test assemblies are pulled to failure in the peeling mode on a mechanical testing machine.

Adhesive A resulted in 14 lbs. peel strength with 60% failure in the metal-elastomer interface, while adhesive B resulted in 16 lbs. peel strength to stock break with 100% elastomer tearing.

In the same fashion bonding is assessed using an unvulcanized but compounded silicone elastomer designated 5-345 (CR Industries). The vulcanization cycle is 6 minutes at 182° C.

Adhesive A resulted in 3 lbs. peel strength with total interfacial failure while adhesive B resulted in 7 lbs. peel strength to stock break with 100% elastomer tearing.

EXAMPLE V

An unvulcanized but compounded silicone elastomer used in the manufacture of silicone-to-steel gaskets and recommended to be vulcanized for 8 minutes at 177° C. is bonded to zinc phosphatized steel coupons using seven different adhesive compositions. The adhesive compositions are prepared at 18% total non-volatile content using the stabilized phenolic resole dispersion of the preceding examples and increasing amounts of vinyltriethoxy silane as shown in the following table. The compositions are designated 1 through 7.

|  | 1 | 2 | 3 | 4 | 5 | 6 | 7 |
|---|---|---|---|---|---|---|---|
| Resole (non-volatile portion) | 18 | 17 | 16 | 15 | 14 | 13 | 12 |
| Vinyltrielkoxy silane | 0 | 1 | 2 | 3 | 4 | 5 | 6 |
| Total water | 82 | 82 | 82 | 82 | 82 | 82 | 82 |

Zinc phosphatized steel coupons are dip coated with each of the compositions. Bonding and testing are as in the Example IV.

The results are as follows:

|  | 1 | 2 | 3 | 4 | 5 | 6 | 7 |
|---|---|---|---|---|---|---|---|
| Peel strength (lbs) | 2 | 16 | 11 | 25 | 23 | 23 | 24 |
| Mode of failure (% of elastomer tearing) | 0 | 15 | 93 | 100 | 100 | 100 | 100 |

EXAMPLE VI

Adhesive compositions for dip-coating of stainless steel coupons are prepared as follows:

A. Three grams of mercaptopropyl trimethoxy silane and 64 grams of distilled water are added to 33.3 grams of the stabilized phenolic resole dispersion as used in the preceding examples.

B. Twenty-five grams of mercaptopropyl trimethoxy silane and 41.7 grams of deionized water are added to 33.3 grams of the same stabilized phenolic resole dispersion. The very large amount of silane that could be added to the resin without extra emulsifying agent or protective colloid is considered to be unexpected.

Both adhesives dried on the coupons to relatively clear, colorless films. Bonding and testing are as in the preceding examples except that the elastomer used is a nitrile butadiene rubber cured with both sulfur and organic peroxide (designated CN-32, Freudenberg-NOK). It is reported to be unusually difficult to bond. The vulcanization cycle is 5 minutes at 180° C.

The results are as follows:

| | |
|---|---|
| Adhesive A: | 5 lbs. peel strength, total interfacial failure |
| Adhesive B: | 77 lbs. peel strength (stock break); 98% elastomer-tearing |

EXAMPLE VII

By way of contrast with Adhesive B of Example VI, 25 grams of mercaptopropyl trimethoxy silane are dissolved in 75 g. of industrial grade ethyl alcohol. Bonding tests are conducted as in Example VI using stainless steel coupons and the same sulfur-peroxide cured nitrile butadiene rubber of Example IV. The bonded samples show an average peel strength of 27 lbs. but the failure is 100% interfacial.

EXAMPLE VIII

Using Adhesive B of Example VI, bonding tests are conducted as in the preceding examples using the following elastomers:

A. A nitrile butadiene rubber designated 5-150 from ER Industries, cured for 6 minutes at 180° C.

B. A carboxylated sulfur cured nitrile butadiene rubber designated S-193 from CR Industries, cured 6 minutes at 180° C.

The results are as follows:

Elastomer A: 45 lbs peel strength, stock break; 97% elastomer tearing.

Elastomer B: 45 lbs peel strength, stock break; 98% elastomer tearing.

EXAMPLE IX

Four parts, by weight, of vinyltriethoxy silane are mixed with 31.1 parts of the phenolic bisphenol A resole dispersion as used in Example I.

One sample of this composition is placed in an oven at 50° C. for 5½ weeks. Another sample is stored for one day at room temperature.

For dip-coating grit-blasted steel coupons, both adhesive samples, after storing, are diluted with deionized water (2 parts water for each part of adhesive composition).

Pads of elastomer (the same as used in Example IV) ¼" thick and 1" in width are bonded to the adhesive-coated steel coupons in a vulcanizing press for 15 minutes at 171° C.

After vulcanization the elastomer-coupon test assemblies are pulled to failure in the peeling mode on a mechanical testing machine.

The test assemblies bonded with the oven-aged adhesive averaged 31 lbs. peel strength with 100% failure in the elastomer (stock break).

The 1-day old adhesive furnished bonded test assemblies having 31 lbs. average peel strength with 94% failure in the elastomer.

This example illustrates that many weeks of oven-aging at 50° C., which would probably correspond to several months at room temperature, does not lessen this aqueous adhesive's excellent adhesive bonding efficacy.

EXAMPLE X

An aqueous emulsion of a phenolic resole is prepared by mixing 40 parts, by weight, at a 70%, by weight, solution of a low molecular weight, highly methylolated resole of ordinary phenol in methyl ethyl ketone; 25 parts of a 12% solution of water-soluble polyvinyl alcohol (AIRVOL 805 of Air Products, Co.) in deionized water, and 35 parts of deionized water. The resulting emulsion is very light tan in color, with good colloidal appearance, good resistance to settling and no creaming.

To 100 parts of this emulsion are added 8 parts of vinyltriethoxy silane with shaking. The initial water-immiscible droplets of silane are, upon several minutes of shaking, uniformly assimilated into the phenolic resole emulsion.

One part of this composition is diluted with 1 part of deionized water to form Adhesive A; and another part is diluted with 2 parts of deionized water to form Adhesive B.

Grit-blasted steel coupons are dipped in either A or B and pads of elastomer (as used in Example IV) but ⅛" thick and 1" in width as bonded to the adhesive-coated steel coupons in a vulcanizing press for 15 minutes at 171° C.

As controls, aqueous phenolic resole emulsion alone is used as Adhesive C; and the same adhesive composition as prepared in EXAMPLE IX is used as Adhesive D. Grit-blasted steel coupons are dipped in these compositions and bonded to the same elastomers using the same procedure.

The results are as follows:

Adhesive A: Average peel strength is 21 lbs., with average mode of failure at 52% elastomer-tearing and 48% interfacial between elastomer and adhesive.

Adhesive B: Average peel strength is 21 lbs., with 23% elastomer tearing.

Adhesive C: Average peel strength of 10 lbs., and 100% interfacial failure between the elastomer and adhesive.

Adhesive D: Average peel strength is 21 lbs., with failure by 100% elastomer tearing.

Modification is possible in the selection of specific ingredients in the preparation of the composition of the present as well as in the exact procedure used in the preparation and use of the composition without departing from the scope of the claims.

What is claimed is:

1. The method of preparing an aqueous adhesive composition in the form of a colloidal oil-in-water type emulsion which comprises mixing a water-immiscible organo-functional silane with a stable dispersion of a substantially water-insoluble phenolic resole in water.

2. The method of claim 1 where the water-immiscible organo-functional silane has the formula:

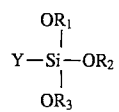

where Y is an alkenyl group having 2 to 4 carbon atoms, an alkenylalkyl group having 3 to 7 carbon atoms or a mercaptoalkyl group having 2 to 4 carbon atoms, and $R_1$, $R_2$ and $R_3$ are the same or different alkyl or alkoxyalkyl groups having up to 4 carbon atoms.

3. The method of claim 2 wherein the water-immiscible organo-functional silane is vinyl-triethoxy silane, vinyltrimethoxy silane, mercaptopropyl-trimethoxy silane or mercatopropyltriethoxy silane.

4. The method of any of claims 1 to 3 wherein the proportion of organo-functional silane to phenolic resole is from about 1 to about 100%, by weight, of the former based on the weight of the phenolic resole solids.

5. The method of any of claims 1 to 3 wherein the proportion of organo-functional silane to phenolic resole is from about 10 to about 30%, by weight, of the former based on the weight of the phenolic resole solids.

6. The method of claim 5 wherein the water-immiscible organo-functional silane is vinyltriethoxy silane.

7. An aqueous adhesive composition in the form of a colloidal oil-in-water type emulsion comprising a co-dispersion of a water-immiscible organo-functional silane and a stable dispersion of a substantially water-insoluble phenolic resole in water.

8. The composition of claim 7 where the water-immiscible organo-functional silane has the formula:

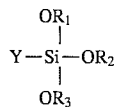

wherein Y is an alkenyl group having 2 to 4 carbon atoms, an alkenylalkyl group having 3 to 7 carbon atoms or a mercaptoalkyl group having 2 to 4 carbon atoms, and $R_1$, $R_2$, and $R_3$ are the same or different alkyl or alkoxyalkyl groups having up to 4 carbon atoms.

9. The composition of claim 8 wherein the water-immiscible organo-functional silane is vinyltriethoxy silane, vinyltrimethoxy silane, mercaptopropyltrimethoxy silane or mercaptopropyltriethoxy silane.

10. The composition of any of claims 7 to 9 wherein the proportion of organo-functional silane to phenolic resole is from about 1 to about 100%, by weight, of the former based on the weight of the phenolic resole solids.

11. The composition of any of claims 7 to 9 wherein the proportion of organo-functional silane to phenolic resole is from about 10 to about 30%, by weight, of the former based on the weight of the phenolic resole solids.

12. In the bonding of an elastomer to a metal wherein the elastomer and metal are brought together with an adhesive composition between and the resulting structure is subjected to heat and pressure to cure the adhesive, the improvement wherein the adhesive is the dried composition of claim 7.

13. The method of claim 12 wherein the elastomer is a peroxide-curing elastomer and the organo-functional silane in the adhesive is an alkenyl-functional silane.

14. The method of claim 13 wherein the alkenyl-functional silane is vinyltriethoxy silane.

15. The method of claim 12 wherein the elastomer is a sulfur- or sulfur-peroxide curing elastomer and the organo-functional silane in the adhesive is a mercapto-functional silane.

16. The method of claim 15 wherein the organo-functional silane in the adhesive is mercaptopropyltrimethoxy silane or mercaptopropyltriethoxy silane.

* * * * *